United States Patent [19]
Stephenson et al.

[11] Patent Number: 5,642,607
[45] Date of Patent: Jul. 1, 1997

[54] CONTROL DEVICE FOR SELECTIVELY LIMITING STROKE OF SWING ACTUATOR FOR IMPLEMENT MID-MOUNTED PIVOT TONGUE

[75] Inventors: Roger Dale Stephenson, Ottumwa, Iowa; Mark Alan Jordan, Fowler, Ind.; Stephen Kenneth Parsons, Ottumwa, Iowa

[73] Assignee: Deere & Company, Moline, Ill.

[21] Appl. No.: 608,384

[22] Filed: Feb. 28, 1996

[51] Int. Cl.⁶ .................................................. A01B 73/00
[52] U.S. Cl. .................... 56/15.1; 56/192; 56/228; 172/240
[58] Field of Search .................... 56/15.1, 192, 228, 56/10.2, 15.5; 172/240, 241, 244, 625, 248, 311; 280/415 R, 415 B, 411 A, 411 B, 411 R

[56] References Cited

U.S. PATENT DOCUMENTS

| | | | |
|---|---|---|---|
| 3,919,831 | 11/1975 | Halls et al. | 56/228 |
| 4,552,375 | 11/1985 | Kinzenbaw | 280/415 R |
| 4,558,560 | 12/1985 | Koch | 56/228 |
| 4,905,466 | 3/1990 | Heppner | 56/15.1 X |
| 5,025,616 | 6/1991 | Moss | 56/15.1 X |
| 5,136,828 | 8/1992 | Ermacora | 56/15.5 X |

*Primary Examiner*—Randolph A. Reese
*Assistant Examiner*—Robert Pezzuto

[57] ABSTRACT

An implement includes a mid-mounted pivot tongue that is movable in a normal range of movement when the implement is working and to a transport position for towing the implement endwise when the implement is to be transported. Two embodiments of a stroke control device are provided and each acts to limit the stroke of a tongue-swing hydraulic actuator to operate for swinging the tongue through its operating range during normal operation of the implement, with each stroke control device being selectively operable to a stroke-freeing position permitting the actuator to operate through its entire stroke for moving the tongue beyond its operating range to a transport position. The stroke control devices and the tongue include cooperating structure for locking the tongue in its transport position.

10 Claims, 5 Drawing Sheets

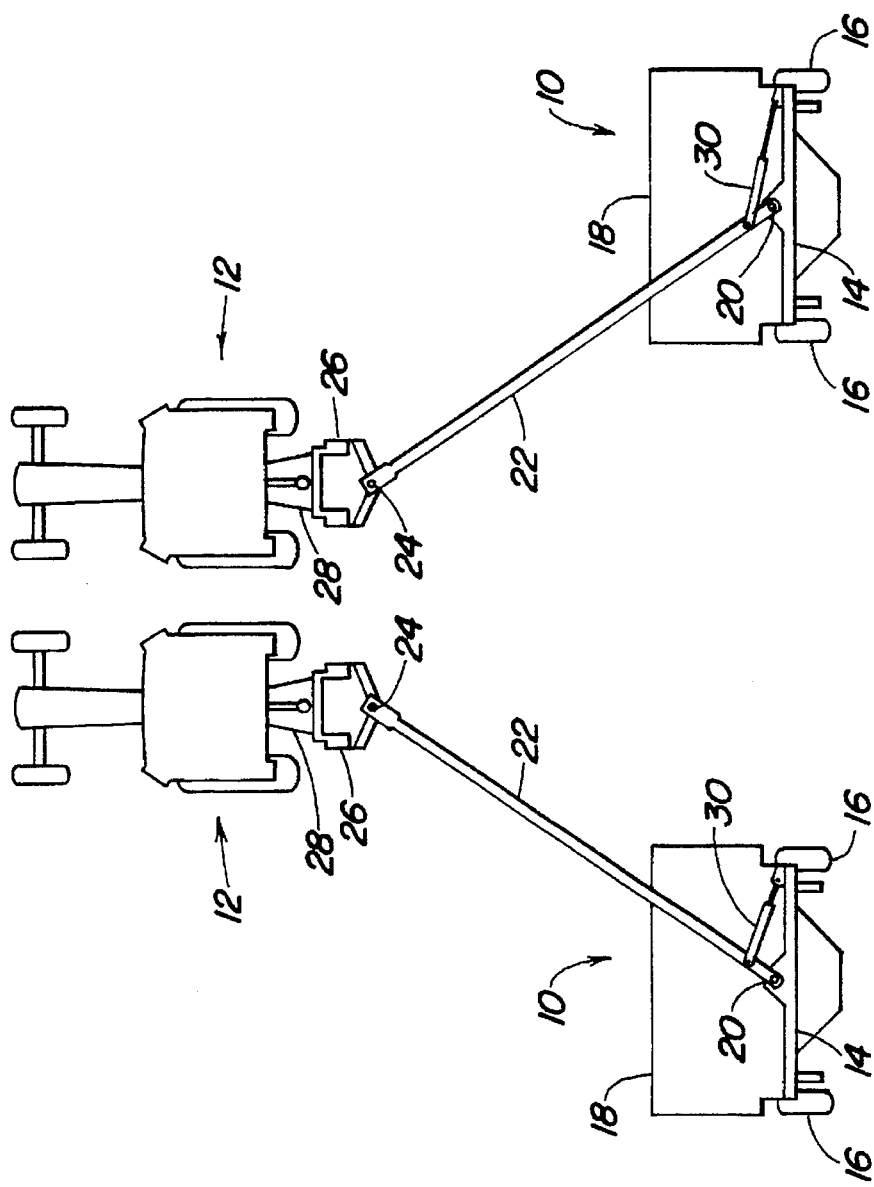
FIG. 2
FIG. 1
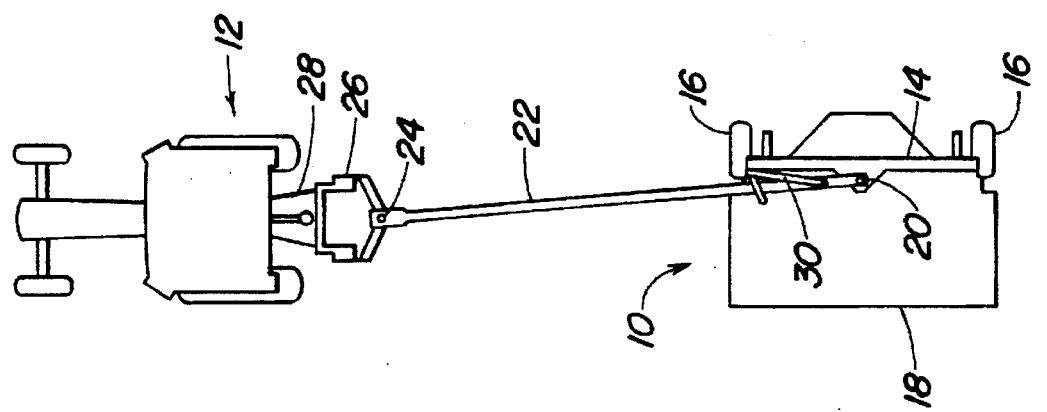
FIG. 3

CONTROL DEVICE FOR SELECTIVELY LIMITING STROKE OF SWING ACTUATOR FOR IMPLEMENT MID-MOUNTED PIVOT TONGUE

BACKGROUND OF THE INVENTION

The present invention relates to crop-harvesting implements having a mid-mounted tongue which extends over a header of the implement and, more particularly relates to such implements as are adapted for being placed on a trailer for endwise transport using the implement tongue as the towing connection with the prime mover.

The headers of crop-harvesting implements often have a working width which is too great for permitting the implement to pass through gates in fences or to be safely moved down a road. It is known to provide trailers for the endwise transport of such implements. In the case where the implement are provided with mid-mounted pivot tongues which extend over the header to the main frame of the implement, the tongues remain coupled to the tractor when the implement is loaded for transport and are used to tow the combined implement and trailer.

During normal operation of an implement equipped with a mid-mounted tongue, as described in the previous paragraph, an extensible and retractable hydraulic actuator is used to change the angle between the tongue and the implement frame so as to cause the implement to track to one side or the other of the towing tractor, this operation being desired so that crop to be harvested is not run over by the tractor. Because the implement would be unstable if the tongue were swung beyond a working range necessary for producing the above-noted tracking, it is desired to limit swinging movement of the tongue to such working range. However, it is necessary that the tongue be swung a considerable amount beyond its working range when the tongue is being used for pulling the combined implement and trailer when the implement is loaded on the trailer for endwise transport and, accordingly, it is desired to permit the tongue to be selectively swung beyond its working range to a transport position.

U.S. Pat. No. 4,558,560 discloses a stop plate carrying abutments and being mounted for selective movement between a first position, wherein the abutments are disposed for limiting pivotal movement of an implement tongue to a working range, and a second position wherein the abutments are moved to permit the tongue to swing beyond its working range to a transport position.

While the patented plate structure performs the desired function of permitting pivotal movement of the tongue beyond its working range only when it is desired that the tongue be placed in a transport position, this structure involves several parts and weldments that add cost to the implement.

SUMMARY OF THE INVENTION

According to the present invention there is provided an improved structure for maintaining a mid-mounted implement pivot tongue in its normal working range of movement during field operation of the implement while permitting the tongue to be selectively moved to a transport position when the implement is loaded on a trailer for endwise transport.

A broad object of the invention is to provide a simple structure for controlling pivotal movement of a mid-mounted implement pivot tongue so that the tongue remains within a working range of movement during field operation of the implement but which permits selective movement of the tongue to a transport position when the implement is loaded on a trailer for endwise transport.

A more specific object of the invention is to provide an implement having a mid-mounted pivot tongue swingable through a normal working range, and beyond to a transport position, by using an extensible and retractable hydraulic actuator and to equip the actuator with a stroke control device moveable between a normal stroke-limiting position, wherein it limits the stroke of the actuator to that necessary for swinging the tongue within its normal working range, and a stroke-freeing position permitting the actuator to be fully stroked to move the tongue beyond its working range to a transport position.

Yet a more specific object of the invention is to provide a stroke control device, as described in the immediately preceding object which is in the form of an elongate lever having a channel-like section and being mounted, according to a first embodiment, at the pivotal connection of the rod end of the hydraulic actuator with the implement frame, and according to a second embodiment, at a pivot post provided on the cylinder of the hydraulic actuator, with the lever being pivotable between a stroke-limiting position, wherein the channel-like section receives and extends along the rod of the actuator so as to engage the actuator cylinder to limit the stroke of the actuator, and a stroke-fleeing position wherein the channel section is angled away from the actuator rod so as to permit full stroke of the actuator.

Another object of the invention is to provide a stroke control device as set forth in the immediately preceding object wherein, in accordance with the first embodiment, a notch is provided in the channel-like section of the lever, and in accordance with the second embodiment, a notch is provided in an arm of the lever, the notch of each embodiment being for receiving a pin carried by the tongue, when the tongue is swung to its transport position, for latching the tongue in this position.

Still another object of the invention is to provide a spring for biasing the lever of the stroke control device to its stroke-limiting position and to provide an actuator for moving the lever to its stroke-freeing position.

These and other objects of the invention will become apparent from a reading of the ensuing description together with the appended drawings.

BRIEF DESCRIPTION OF THE DRAWINGS

FIG. 1 is a schematic top plan view of a towed implement having a mid-mounted tongue to which an extensible and retractable, hydraulic tongue-swing actuator is connected, and a stroke control device according to a first embodiment of the present invention being associated with the actuator which is partially retracted angling the tongue in a right extreme of its working range and the implement tracking leftwardly of the towing tractor.

FIG. 2 is a view like FIG. 1 but showing the tongue-swing actuator extended angling the tongue to a left extreme of its working range and with the implement tracking rightwardly of the towing tractor.

FIG. 3 is a schematic top plan view of the implement shown loaded on an implement transport trailer and with the tongue-swing actuator fully retracted angling the tongue righwardly beyond its working range to its transport position.

DESCRIPTION OF THE PREFERRED EMBODIMENT

Figure 4:
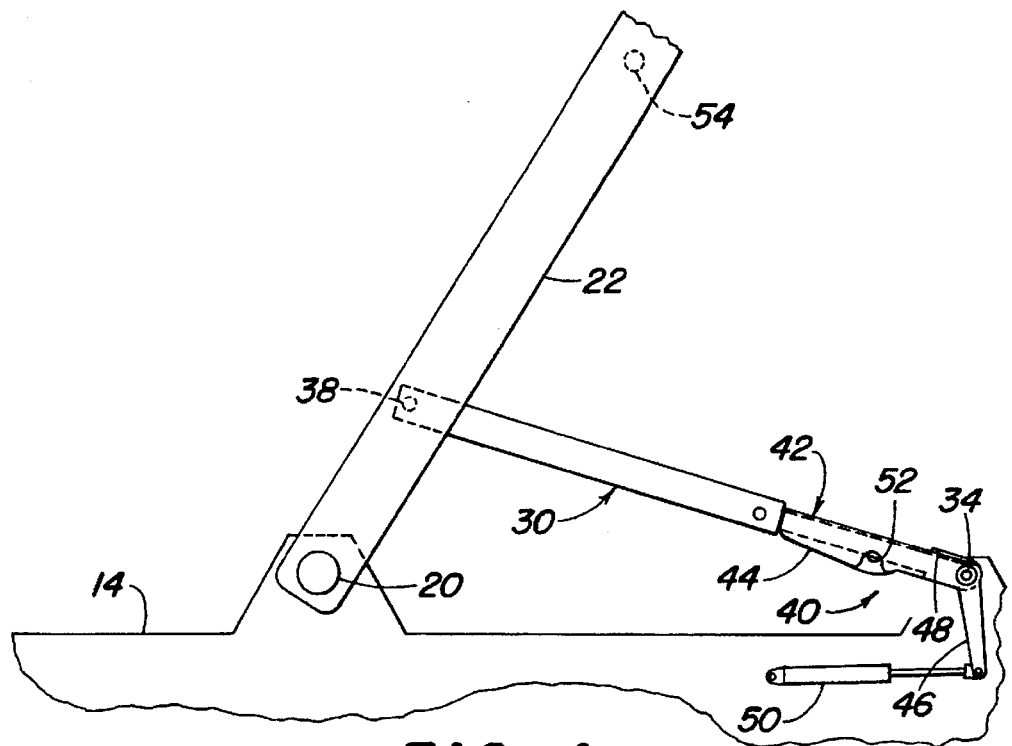
FIGS. 4 and 5 are top plan views respectively showing enlargements of the tongue and tongue-swing actuator positioned as shown in FIGS. 1 and 2, with the stroke control device being shown in its stroke-limiting position.
Figure 5:
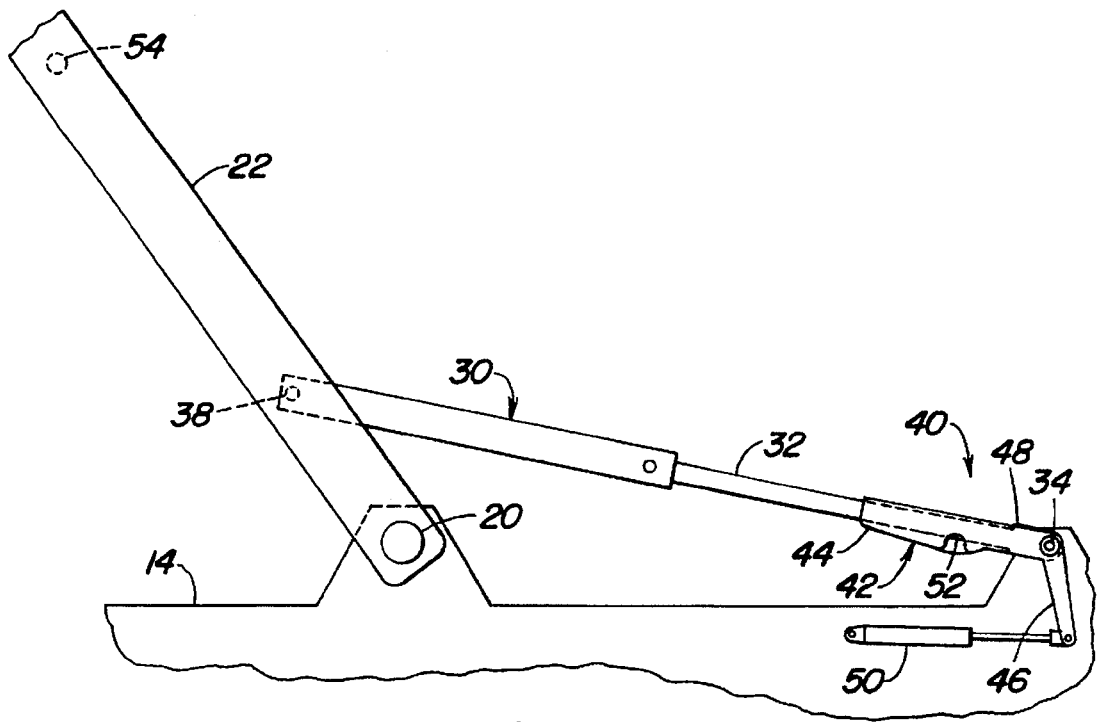

Referring now to FIGS. 1–3, there is shown, in schematic fashion, a towed agricultural implement 10 and a towing tractor 12. The implement 10, for example, could be a mower-conditioner, and includes a main frame 14 supported on a pair of ground wheels 16. A crop-harvesting header 18 is suspended from the frame 14 in a manner well known in the art for permitting floatation of the header during harvesting operation. Extending over the header 18 and having its rear end pivotally connected, as at 20, to a location midway between opposite ends of the frame 14 is a pivot tongue 22. A forward end of the tongue 22 is pivotally connected, as by a pin 24, to a hitch adapter 26 having opposite legs coupled to lower links of a three-point hitch 28 carried by the tractor 12. Provided for causing the implement 10 to track either leftwardly of the tractor 12, as shown in FIG. 1, or rightwardly of the tractor, as shown in FIG. 2, is an extensible and retractable, hydraulic tongue-swing actuator 30. Referring now also to FIGS. 4 and 5, it can be seen that the actuator 30 includes a piston rod 32 pivotally connected, as at pin 34, to a right end of the implement frame 14 and having a cylinder 36 pivotally connected, as at pin 38, to the tongue 22.

Figure 6:
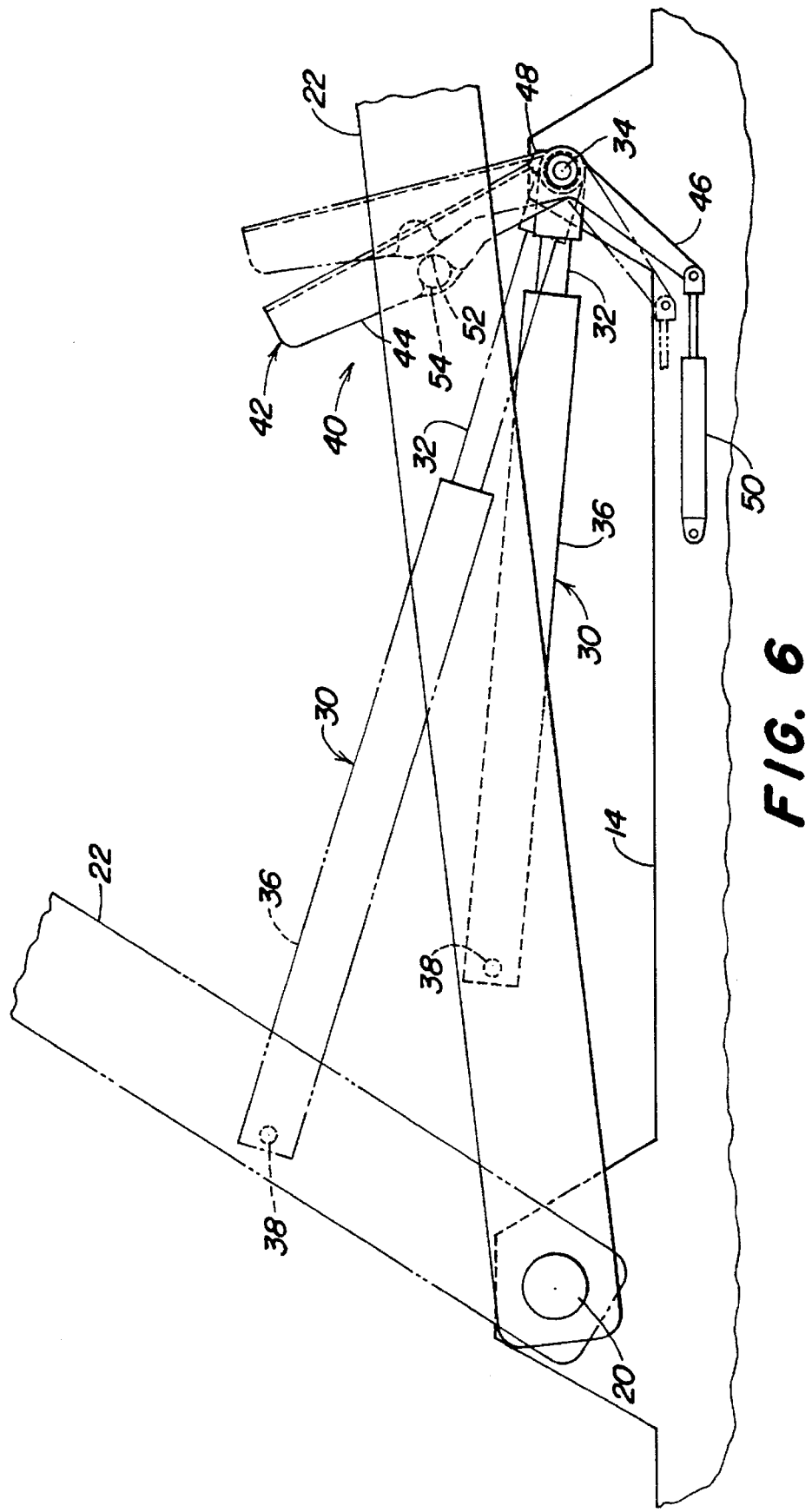
FIG. 6 is a top plan view showing the first embodiment of the stroke control device in dashed lines in its stroke-freeing position together with the tongue and actuator at the right extreme of the tongue working range, and showing the stroke control device in solid lines in its tongue latch position together with the tongue and actuator at the transport position of the tongue.

As can best be seen in FIGS. 4–6, a stroke control device 40, constructed in accordance with a first embodiment of the invention, is associated with the tongue-swing actuator 30. Specifically, the stroke control device 40 includes an angular stroke-control lever 42 mounted for pivoting about the piston rod mounting pin 34 and including a channel-shaped first arm or section 44 and a second arm or section 46 joined at the pin 34. The lever 42 is thus mounted for swinging between a stroke-limiting position, as shown in FIGS. 4 and 5, wherein the first arm 44 is received over and extends along the piston rod 32 so as to limit the effective retraction stroke of the actuator 30, and a stroke-freeing position, as shown in FIGS. 6, wherein the first arm 44 is angled away from the rod 32 so as to permit an unrestricted retraction stroke of the actuator 30. A positive bias of the lever 42 to its stroke-limiting position is provided by a torsion spring 48 having coils received on the piston rod mounting pin 38 and opposite ends engaged with the frame 14 and lever 42 of the stroke control device 40. A tension spring or other common biasing element could be used in lieu of the torsion spring 48. The lever 42 may be swung from its stroke-limiting position to its stroke-fleeing position by a one-way hydraulic actuator 50 connected between the frame 14 and the second arm or section 46 of the lever 42. Controls for the actuator 50 may be at any convenient location for access by an operator either seated in the tractor 12 or standing on the ground. It is noted that the lever 42 of the stroke control device 40 could be moved to its stroke-freeing position either manually or through the use of a lever-operated linkage instead of through the use of the actuator 50.

When the lever 42 of the stroke control device 40 is in its stroke-freeing position, it serves as a latch for retaining the tongue in its transport position. Specifically, an upper flange of the channel-shaped first arm or section 44 of the lever 42 is provided with a notch 52 and the tongue 22 is provided with a downwardly extending latch pin 54 positioned for entering the notch once the tongue 22 is swung to its transport position and the controller for the stroke control device is actuated for permitting the torsion spring 48 to pivot the lever 42 slightly counterclockwise from its extreme stroke-fleeing position, as shown in solid lines in FIG. 6.

Figure 7:
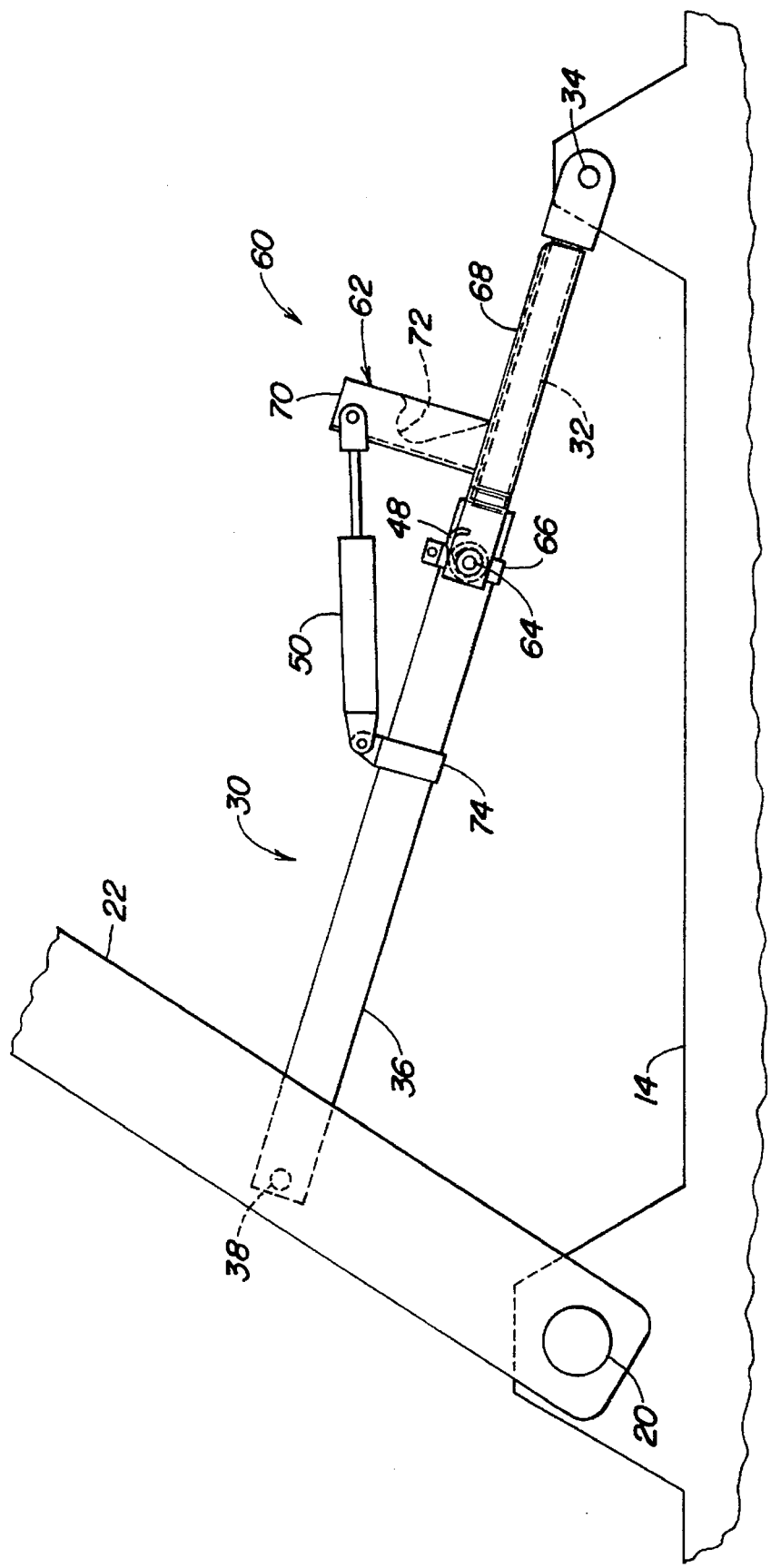
FIG. 7 and 8 is a top plan view like FIG. 6 but showing the second embodiment of the stroke control device and actuator therefor.
Figure 8:
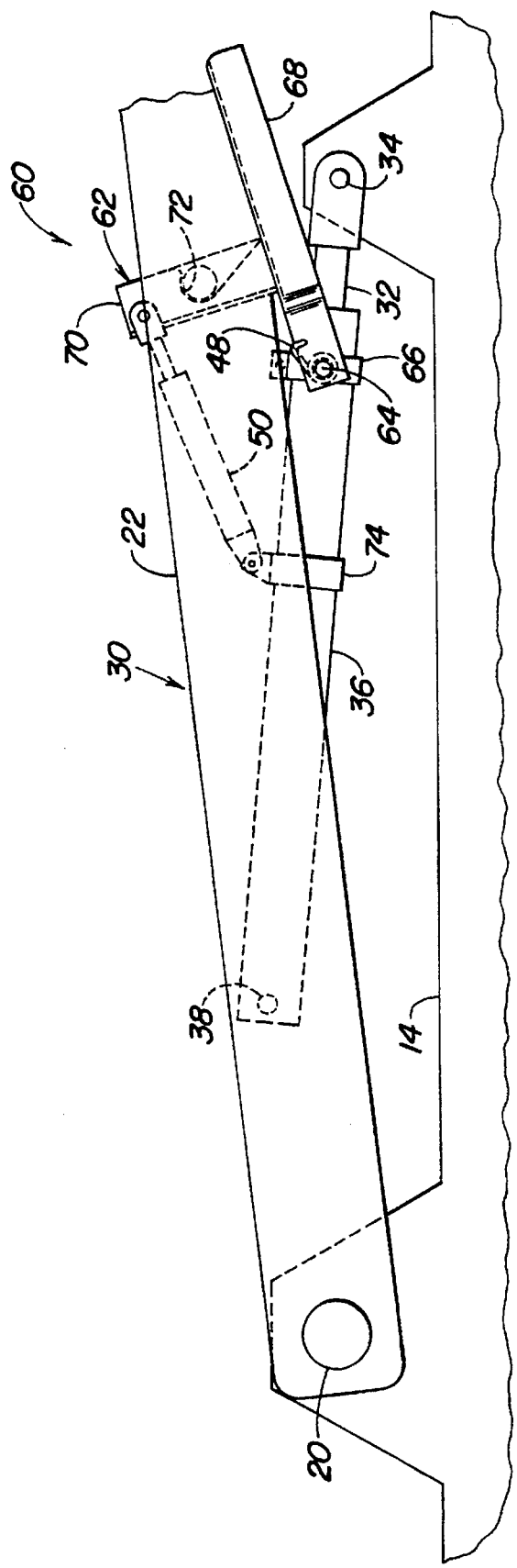

Referring now to FIGS. 7 and 8, there is shown a stroke control device 60 which operates along the same principles as does the stroke control device 40 but differs in that it includes a lever 62 pivotally mounted to the cylinder 36 of the tongue-swing actuator 30 for pivoting about pivot pins 64 formed in opposite extending relationship to each other on a clamp 66 engaged about the cylinder 36. The lever 62 is formed by a first channel-like arm or section 68 having one end pivotally mounted at the pins 64, and a second channel-like arm or section 70 joined to and projecting at approximately a right angle to the first arm 68 at a location spaced from the pivot pins 64. The lever 62 is swingable between a stroke-limiting position, as shown in FIG. 7, wherein the first arm 68 receives and extends along the piston rod 32 so as to, in effect, form an extension of the cylinder 36 which abuts the mounting clevis of the piston rod 32 so as to prevent the actuator 30 from retracting beyond the amount necessary to place the tongue 22 in its extreme right working position, and a stroke-freeing position, as shown in FIG. 8, wherein the first arm 68 is angled away from the actuator piston rod 32, so as to permit the actuator 30 to fully retract and move the tongue 22 to its transport position. The second arm 70 is provided with a notch 72 in its upper flange, the notch 72 receiving the tongue latch pin 38 to lock the tongue 22 in its transport position. In this embodiment, the torsion spring 48 is mounted on one of the pivots 64 and acts to bias the lever 62 clockwise, as viewed in FIGS. 7 and 8, and the actuator 50 is coupled between an outer end of the second arm 70 and a bracket 74 carried by the cylinder 32 of the tongue swing actuator 30.

Thus, it will be appreciated that the stroke control devices 40 and 60 constitute simple, inexpensive means for permitting the tongue 22 to be selectively placed in and locked in its transport position.

Having described the invention what is claimed is:

1. In a towed implement including a wheel-supported main frame, an elongate header suspended from the main frame, a tongue extending over the header and having a rear end pivotally mounted to the main frame at a location midway between opposite ends of the frame, and a two-way hydraulic tongue-swing actuator connected between the frame and the tongue for pivoting the tongue within a normal operating range, the improvement comprising: said tongue-swing actuator having a cylinder and piston rod dimensioned so as to undergo extension and retraction through a partial stroke sufficient for pivoting the tongue within said normal operating range and through a complete stroke for pivoting said tongue beyond said normal operating range to a transport position wherein the tongue is operable for effecting endwise transport of the implement; a stroke-control device; means mounting said stroke-control device to one of said main frame and tongue-swing actuator for movement between a stroke-limiting position, wherein said stroke-control device constrains said tongue-swing actuator to operate within said partial stroke, and a stroke-freeing position wherein said stroke-control allows said tongue-swing actuator to operate within said complete stroke so as to swing said tongue beyond said normal operating range to said transport position.

2. The towed implement defined in claim 1 wherein said tongue and stroke-control device include cooperating means for latching said tongue in said transport position.

3. The towed implement defined in claim 1 wherein said stroke-control device includes an elongate lever pivotally mounted to said main frame and including a channel-shaped first section; said lever being swingable between a stroke-limiting position, wherein said lever has a length of said piston rod located within said channel-shaped section, and said stroke-freeing position, wherein said channel-shaped section is angled away from said piston rod.

4. The towed implement defined in claim 3 wherein said channel-shaped first section of said lever is provided with a notch; and said tongue having a pin disposed for being received in said notch when the tongue is swung to said transport position so that the tongue is locked in this position.

5. The towed implement defined in claim 1 and further including biasing means yieldably urging said stroke-control device toward said stroke-limiting position.

6. The towed implement as defined in claim 5 wherein said stroke-control device includes an actuator for acting in opposition to said biasing means for moving said stroke-control device to said stroke-freeing position.

7. The towed implement defined in claim 1 wherein said stroke-control device includes an elongate lever pivotally mounted to said cylinder and including a first channel-shaped section; said lever being swingable between said stroke-limiting position, wherein said stroke control device has a length of said piston rod located within said channel-shaped section, and a stroke-freeing position, wherein said channel-shaped section is angled away from said piston rod.

8. The towed implement defined in claim 7 wherein a biasing means is provided for urging said lever to said stroke-limiting position; and a hydraulic actuator being mounted between said cylinder said lever of the stroke-control device for selectively moving said lever away from said stroke-limiting position towards said stroke-freeing position.

9. The towed implement defined in claim 7 wherein said lever of the stroke-control device includes a second channel-shaped arm section provided with a notch and said tongue including a pin disposed for reception in said notch when the lever is moved towards said stroke-limiting position once the tongue is positioned in said transport position.

10. The towed implement defined in claim 3 wherein said lever and piston rod have a common pivotal connection with said main frame.

* * * * *